US008857788B2

(12) United States Patent
Sanuki et al.

(10) Patent No.: US 8,857,788 B2
(45) Date of Patent: Oct. 14, 2014

(54) ELECTRONIC EXPANSION VALVE (75) Inventors: Yasutaka Sanuki, Yokkaichi (JP); Yukihiro Takano, Fujimi (JP); Naoki Inoshita, Yokkaichi (JP); Koji Takiguchi, Kounosu (JP); Shusuke Saito, Yokohama (JP); Nobutoshi Migishima, Fukaya (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 0 days.

(21) Appl. No.: 13/389,748

(22) PCT Filed: Mar. 10, 2011

(86) PCT No.: PCT/JP2011/055676
§ 371 (c)(1),
(2), (4) Date: Apr. 3, 2012

(87) PCT Pub. No.: WO2011/114991
PCT Pub. Date: Sep. 22, 2011

(65) Prior Publication Data
US 2012/0326064 A1 Dec. 27, 2012

(30) Foreign Application Priority Data
Mar. 18, 2010 (JP) .................................. 2010-062406

(51) Int. Cl.
*F16K 31/02* (2006.01)
*F25B 41/06* (2006.01)

(52) U.S. Cl.
CPC .............. *F25B 41/062* (2013.01); *Y02B 30/72* (2013.01); *F25B 2341/065* (2013.01)
USPC .................................................. 251/129.15

(58) Field of Classification Search
USPC ..................................................... 251/129.15
See application file for complete search history.

(56) References Cited

U.S. PATENT DOCUMENTS

| 3,589,672 | A | * | 6/1971 | Haolloman | ............... 251/129.16 |
| 5,785,297 | A | * | 7/1998 | Ha | ............ 251/129.14 |
| 2006/0163512 | A1 | * | 7/2006 | Ogawa | ...................... 251/129.15 |
| 2007/0051910 | A1 | * | 3/2007 | Kimura et al. | ................... 251/65 |
| 2009/0039302 | A1 | * | 2/2009 | Giacomini et al. | ....... 251/129.15 |
| 2009/0294712 | A1 | * | 12/2009 | Hutchings et al. | ........ 251/129.15 |
| 2011/0297858 | A1 | * | 12/2011 | Jin | ............................ 251/129.15 |
| 2011/0315907 | A1 | * | 12/2011 | Ams et al. | ................. 251/129.15 |

FOREIGN PATENT DOCUMENTS

| JP | 53-001352 | | 1/1978 |
| JP | 11-316068 | A | 11/1999 |
| JP | 2002-71045 | A | 3/2002 |
| JP | 2003-329698 | | 11/2003 |
| JP | 2005-90762 | A | 4/2005 |
| JP | 2005-249191 | A | 9/2005 |
| JP | 2009-167924 | A | 7/2009 |

* cited by examiner

*Primary Examiner* — Eric Keasel
*Assistant Examiner* — Ian Paquette
(74) *Attorney, Agent, or Firm* — Manabu Kanesaka

(57) ABSTRACT

An electronic expansion valve (50) includes a small hole (54a) that expands a refrigerant, a valve body (55c) that opens and closes the small hole, an elastic member (70) that urges the valve body to close the small hole, and a solenoid (61) that suctions the valve body to open the small hole, and expands the refrigerant by opening and closing the valve body. The elastic member is a disc spring in which a plurality of slits (73) formed in a spiral form is provided at mutually equal pitches on the perimeter. Therefore, there is no need for a guide, the occurrence of sludge due to sliding is suppressed, and the electronic expansion valve operates stably over a long period.

6 Claims, 7 Drawing Sheets

ELECTRONIC EXPANSION VALVE

RELATED APPLICATIONS

The present application is National Phase of International Application No. PCT/JP2011/055676 filed Mar. 10, 2011, and claims priority from Japanese Application No. 2010-062406, filed Mar. 18, 2010.

TECHNICAL FIELD

The present invention relates to an electronic expansion valve annexed to a refrigerant cycle of an automatic vending machine or the like, and in particular, relates to an electronic expansion valve that controls a refrigerant by pulse energizing a solenoid, and opening and closing a valve body with electromagnetic force.

BACKGROUND ART

As an electronic expansion valve, there is known an electronic expansion valve with high controllability that regulates the extent of expansion of a refrigerant by changing the extent to which an expansion path is opened using a stepping motor (for example, refer to Patent Document 1), but using a stepping motor is expensive. In response to this, there is known a low priced pulse drive type expansion valve that regulates the extent of expansion of a refrigerant by opening and closing an electromagnetic valve (for example, refer to Patent Document 2).

With the pulse drive type expansion valve (a refrigerant flow rate control device), by on/off controlling the electromagnetic valve, a degree of superheat of an evaporator outlet refrigerant is adjusted to reach a predetermined value, so that operating highly efficiently a refrigerant cycle is possible. An operating configuration of the pulse drive type expansion valve is such that a valve body is opened by a solenoid, and the valve body is closed by a coil spring.

RELATED ART DOCUMENTS

Patent Documents

Patent Document 1: JP-A-2003-329698
Patent Document 2: JP-A-53-1352

OUTLINE OF THE INVENTION

Problems that the Invention is to Solve

However, with the kind of refrigerant flow rate control device (electronic expansion valve) described in Patent Document 2, a coil spring formed by twisting into a spiral form is used as a return elastic member, so a force also acts in a radial direction when a load is applied in an axial direction. As a result, a guide regulating a drive in the axial direction is necessary, and the device slides among the guide, a plunger and the spring. At this time, sludge generated on a sliding contact surface is transferred in the refrigerant, gradually clogging a valve seat portion, a gap portion, and the like, and causing a danger of malfunction of the refrigerant cycle when using over a long period such that the number of opening and closing operations reaches the several hundred million level.

The invention, bearing in mind the heretofore described situation, has an object of providing a low cost refrigerant cycle electronic expansion valve that solves the heretofore described problem, and operates stably over a long period.

Means for Solving the Problem

In order to achieve the object, the first embodiment of the present invention is an electronic expansion valve comprising a small hole for expanding a refrigerant, a valve body opening and closing the small hole, an elastic member urging the valve body to close the small hole, and a solenoid that suctions the valve body to open the small hole. The electronic expansion valve expands the refrigerant by opening and closing the valve body, wherein the elastic member is a disc spring having a plurality of slits formed in a spiral form in a disc-like board and disposed at mutually equal pitches.

The second embodiment of the present invention is an electronic expansion valve wherein in the first embodiment of the electronic expansion valve, the valve body is opened and closed in a certain cycle.

Effect of the Invention

The first embodiment of the present invention is an electronic expansion valve having the elastic member urging the valve body to close the small hole that expands the refrigerant and the solenoid that suctions the valve body to open the small hole, and expands the refrigerant by opening and closing the valve body. By the elastic member being a disc spring having a plurality of slits formed in a spiral form in a disc-like board and disposed at mutually equal pitches, the rigidity of the valve body in the radial direction is increased, and the valve body is optimally driven in the axial direction. As a result, a guide for regulating the axial direction is unnecessary and the occurrence of sludge due to sliding is suppressed. Therefore, it is possible to provide a low cost refrigerant cycle electronic expansion valve that operates stably over a long period.

MODE FOR CARRYING OUT THE INVENTION

Hereafter, referring to the attached drawings, a detailed description will be given of a preferred embodiment of an electronic expansion valve according to the invention used in an automatic vending machine refrigerant circuit that carries out a heat pump operation. The invention is not limited by the embodiment.

Figure 1:
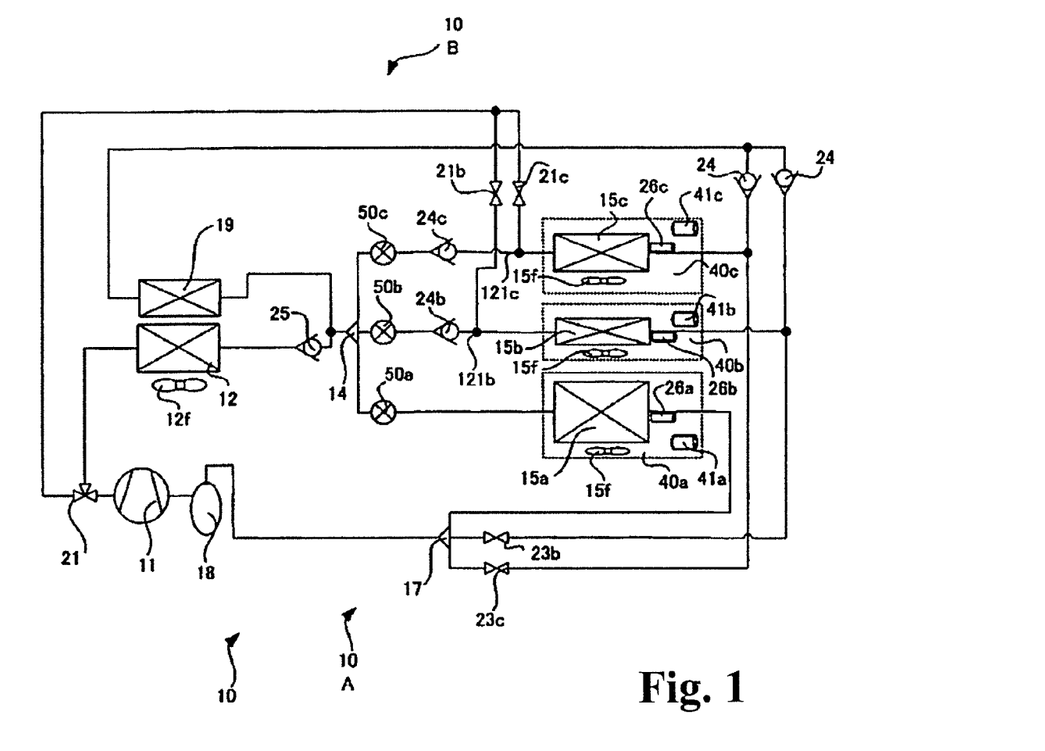
FIG. 1 is a diagram of a refrigerant circuit using an electronic expansion valve according to an embodiment of the present invention.

FIG. 1 is a diagram of a heat pump operation refrigerant circuit of an automatic vending machine having three product storage chambers, wherein one chamber is dedicated to cooling and two chambers is used for cooling and heating. Dotted line enclosures in the diagram schematically indicate a product storage chamber 40a dedicated to cooling and product storage amounts 40b, 40c used for cooling and heating.

A heat pump automatic vending machine cooling/heating unit 10 comprises a machine chamber provided in a lower portion of the automatic vending machine, which includes a compressor 11, a condenser 12, electronic expansion valves 50a, 50b, 50c, an accumulator 18, and an external auxiliary heat exchanger 19; and product storage chambers 40a, 40b, 40c provided in an upper portion of the automatic vending machine, which includes an evaporator 15a and internal heat exchangers 15b, 15c. Each instrument is connected by refrigerant piping. The cooling/heating unit 10 circulates cooled or heated air inside the chambers using the evaporator 15a and internal heat exchangers 15b, 15c in accordance with a cooling and heating operation setting mode, thus cooling or heating products in product storage racks installed in the chambers.

The cooling and heating compressor 11 is provided for compressing a refrigerant and circulating the refrigerant in the circuit. During a cooling-only operation, an evaporating temperature of approximately −10° C. and a condensing temperature of approximately 40° C. are used. During a cooling and heating operation (a heat pump operation), an evaporating temperature of approximately −10° C. and a condensing temperature of approximately 70° C. are used. For example, when an R134a is used as the refrigerant, the operation is carried out at a low pressure of approximately 0.2 MPa, and a high pressure of approximately 1 MPa for a cooling-only operation and approximately 2 MPa for a cooling and heating operation.

The condenser 12 is a finned tube type heat exchanger and a fan 12f is installed in a rear portion thereof for ejecting excessive heat of condensation during a cooling operation.

A flow divider 14 is provided for distributing the refrigerant to the evaporator 15a and internal heat exchangers 15b, 15c.

The evaporator 15a is provided for cooling the product storage chamber 40a, and the internal heat exchangers 15b, 15c are provided for cooling or heating the product storage chambers 40b, 40c. Also, the evaporator 15a and internal heat exchangers 15b, 15c are installed in a lower portion of each product storage chamber, a fan 15f is installed to the rear thereof, and a duct is installed to the rear of the fan 15f. The cooling and heating inside the product storage chambers is carried out by blowing an air cooled or heated by the evaporator 15a and internal heat exchangers 15b, 15c onto the products inside the product storage chambers, and circulating and recovering from the ducts.

A collector 17 collects the refrigerant evaporated from the evaporator 15a and internal heat exchangers 15b, 15c, and returns it to the compressor 11.

The accumulator 18 is an airtight container for taking in the evaporated refrigerant from the collector 17, dividing it into gas and liquid to accumulate the liquid refrigerant, and returning the gas refrigerant to the compressor 11. Also, the accumulator 18 is a container for accumulating excessive refrigerant in the circuit refrigerant circulation.

The external auxiliary heat exchanger 19 is a finned tube type heat exchanger for ejecting excessive condensed heat during a heating operation.

A condenser electromagnetic valve 21 is a three-way electromagnetic valve for switching the flow of refrigerant discharged from the compressor 11 to the condenser 12 or the internal heat exchangers 15b, 15c. Heater electromagnetic valves 21b, 21c open and close paths of the compressed refrigerant flowing from the compressor 11 to the internal heat exchangers 15b, 15c. Cooler outlet electromagnetic valves 23b, 23c open and close paths of the evaporated refrigerant between the internal heat exchangers 15b, 15c and the compressor 11.

Check valves 24, 24 are each connected between the external auxiliary heat exchanger 19 and the internal heat exchangers 15b, 15c for preventing high pressure refrigerant from flowing into the internal heat exchangers 15b, 15c during a cooling or heating operation.

Check valves 24b, 24c are each connected between the electronic expansion valves 50b, 50c and heater electromagnetic valves 21b, 21c for preventing high pressure refrigerant from the heater electromagnetic valves 21b, 21c from flowing into the electronic expansion valves 50b, 50c.

A check valve 25 is connected between an outlet portion of the condenser 12 and an inlet portion of the flow divider 14 for preventing high pressure refrigerant from flowing into the condenser 12 during a cooling or heating operation.

Evaporator temperature sensors 26a, 26b, 26c are installed in the evaporator 15a and internal heat exchangers 15b, 15c for detecting the evaporating temperature of the evaporator 15a and internal heat exchangers 15b, 15c.

Internal temperature sensors 41a, 41b, 41c are installed in the product storage chambers 40a, 40b, 40c for detecting the internal temperature of the product storage chambers 40a, 40b, 40c.

The electronic expansion valves 50 (50a, 50b, and 50c) reduce the pressure of the refrigerant passing through during a cooling operation, and adiabatically expand thereof, and also act as electromagnetic valves that open and close paths of the expanded refrigerant flowing to the evaporator 15a and internal heat exchangers 15b, 15c. A description will be given while referring to FIGS. 2 and 3. The electronic expansion valve 50 comprises a main body upper portion 51, a main body lower portion 52, a main body side portion 53, a valve seat 54, an armature 55, a spacer 56, pins 57, a solenoid 61, fixing pieces 63a, 63b, nuts 64, and a disc spring (elastic member) 70.

Figure 2:
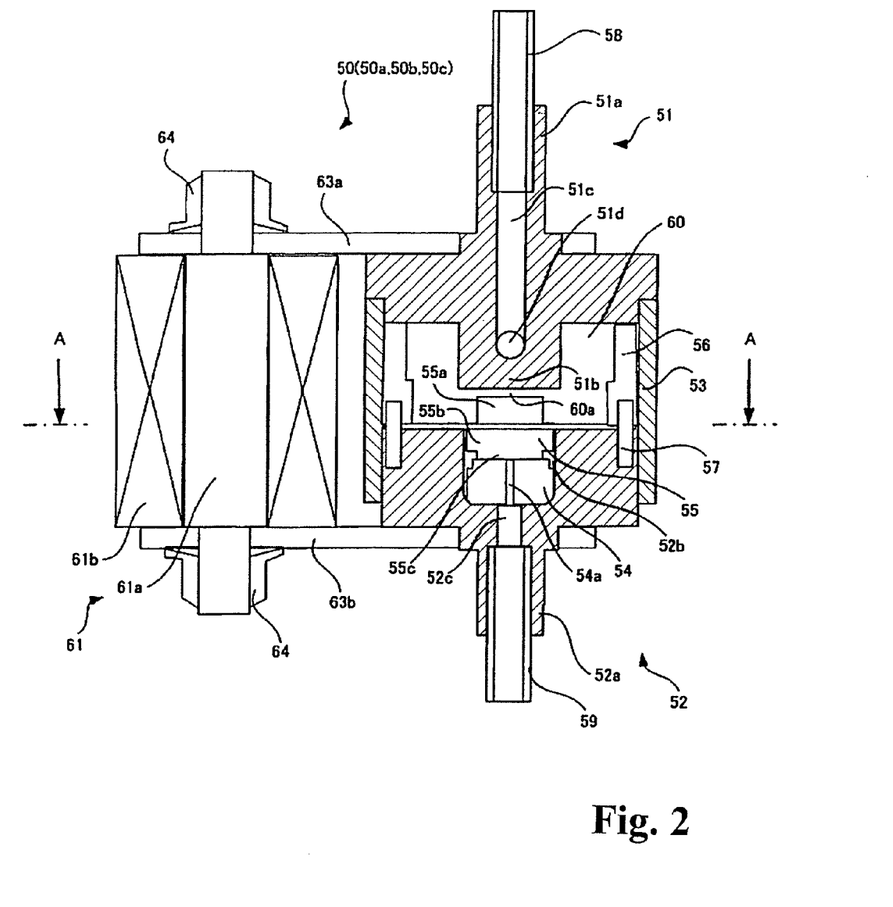
FIG. 2 is a cross-sectional view of the electronic expansion valve according to the embodiment of the present invention.

The main body upper portion 51 is a ferromagnetic cylindrical member, and has an inflow portion 51a provided in an upper portion into which a refrigerant inlet pipe 58 is inserted, a suction portion 51b provided in a lower portion that suctions the armature 55, a vertical hole 51c provided on a central axis linking to the refrigerant inlet pipe 58, and a horizontal hole 51d linking to the vertical hole 51c extending radially and leading to a main body internal portion 60 of the electronic expansion valve 50. Refrigerant flowing in from the refrigerant inlet pipe 58 flows out in a radial direction to the main body internal portion 60 of the electronic expansion valve 50 via the vertical hole 51c and horizontal hole 51d.

The main body lower portion 52 is a ferromagnetic cylindrical member, and has an outflow portion 52a provided in a lower portion into which a refrigerant outlet pipe 59 is inserted, an internal space 52b provided in an upper portion, into which the valve seat 54 and armature 55 are installed, and a hole 52c provided on a central axis linking an orifice (small hole) 54a formed in the valve seat 54 and the refrigerant outlet pipe 59.

The main body side portion 53 is a non-magnetic cylindrical member engaging the main body upper portion 51 and main body lower portion 52 to form the main body internal portion 60.

The valve seat 54 is a non-magnetic cylindrical member fixed to the lower main body portion 52 in which the upper surface is flat and an orifice (small hole) 54a is bored on a central axis.

Figure 3:
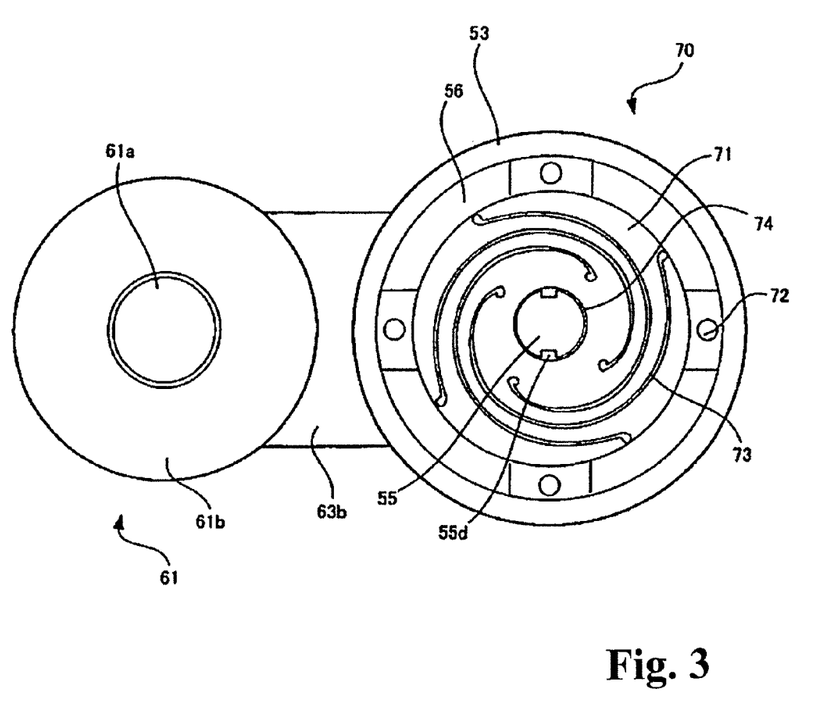
FIG. 3 is a cross-sectional view along line A-A of the electronic expansion valve in FIG. 2.

The armature 55 is a ferromagnetic cylindrical member with a three stage structure whose central diameter is large, and has an adsorption portion 55a of which an upper end surface of an upper portion is flat, a side portion 55b of which a central portion maintains a sufficient gap with the internal space 52b, and a valve body 55c of which a lower end surface of a lower portion is flat and closely attached to an upper portion of the valve seat 54, closing the orifice 54a. The armature 55 is fixed by press-fitting an upper end surface of the side portion 55b and the disc spring 70, is attached to have a gap 60a between the adsorption portion 55a and suction portion 51b, and is urged toward the valve seat 54 by the disc spring 70. Also, a groove 55d forming a refrigerant path is formed to face in the axial direction on a peripheral surface of the side portion 55b of the armature 55, as shown in FIG. 3.

The spacer 56 is a non-magnetic cylindrical member for regulating the distance between the main body upper portion 51 and main body lower portion 52.

The four pins 57 are fixing members for fixing the disc spring 70 in four peripheral places.

The refrigerant inlet pipe 58 is a pipe for allowing condensed refrigerant to flow into the electronic expansion valve 50, and the refrigerant outlet pipe 59 is a pipe for allowing refrigerant expanded by the electronic expansion valve 50 to flow out of the electronic expansion valve 50.

The solenoid 61 is provided for releasing the valve body 55c from the orifice 54a by suctioning the armature 55, and comprises an iron core 61a and a coil 61b. The solenoid 61 has screw portions in an upper portion and is fixed by the nuts 64 via the fixing pieces 63a and 63b.

The fixing pieces 63a and 63b are ferromagnetic plate members with both ends of a flat surface formed semi-circularly, for fixing the solenoid 61, and fixing both the main body upper portion 51 and main body lower portion 52 with screws.

A magnetic flux emitted from the coil 61b flows along a magnetic circuit from the iron core 61a, a fixing piece 63a, a main body upper portion 51, a gap 60a, an armature 55, a main body lower portion 52, and a fixing piece 63b, and returning to the iron core 61a.

The disc spring 70 comprises a main body plate (a disc-like board) 71 configured of a disc-like thin plate member, fixing holes 72 for fixing the disc spring 70 to the main body lower portion 52, slits 73 formed in a spiral form at mutually equal pitches in the main body plate 71, and a central hole 74 for engaging with the armature 55 in the center. The slits 73 formed in a spiral form are formed at equal pitches in four places in the main body plate 71, so the straightness in the axial direction is high, and rigidity in the radial direction is high. For this reason, unlike a coil spring, there is no need for a guide that regulates a drive in the axial direction when the armature 55 is suctioned by the suction portion 51b.

Figure 4:
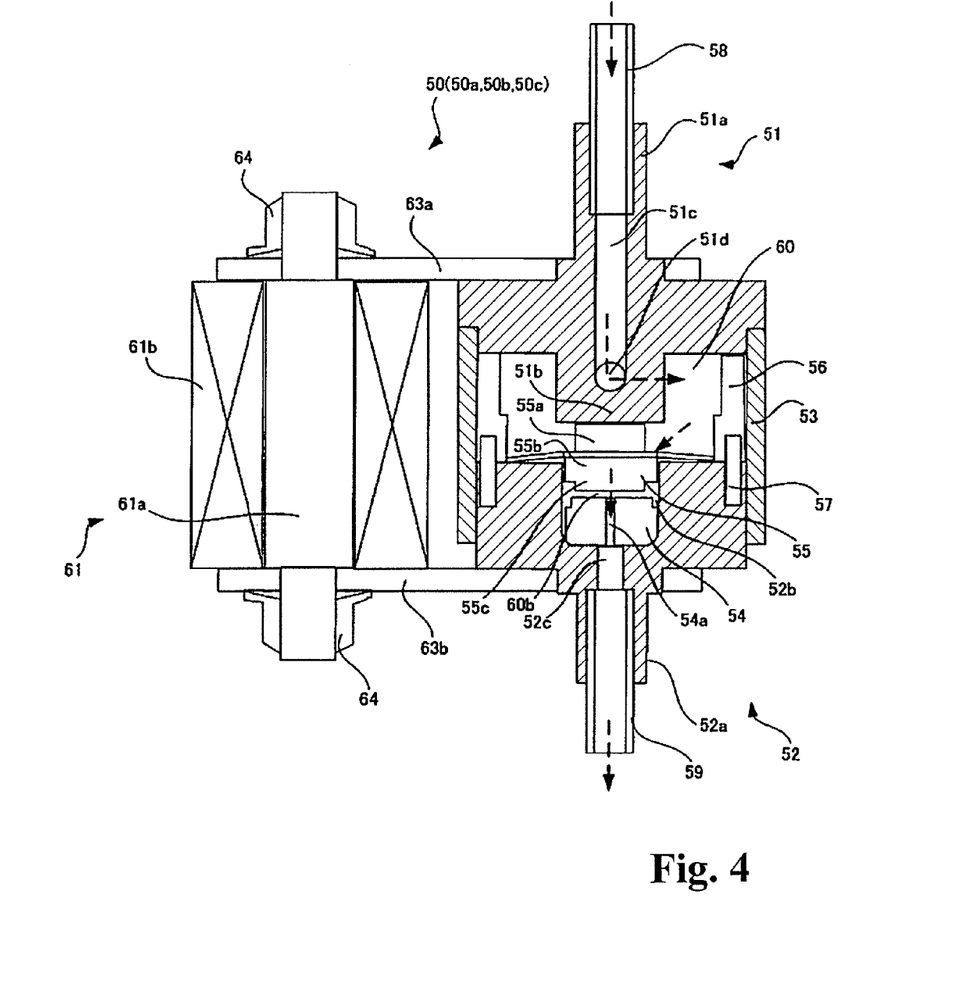
FIG. 4 is a cross-sectional view showing an opened condition of the electronic expansion valve in FIG. 2.

With such a configuration, when the solenoid 61 is energized, the adsorption portion 55a of the armature 55 is adsorbed by the suction portion 51b of the main body upper portion 51, and a gap 60b is formed between the valve body 55c and valve seat 54, as shown in FIG. 4. At this time, condensed refrigerant flowing in from the refrigerant inlet pipe 58 flows into the gap 60b via the vertical hole 51c, the horizontal hole 51d, and the main body internal portion 60 of the main body upper portion 51, the slits 73 of the disc spring 70, and the groove 55d of the armature 55, as shown by arrows in the drawing. Then, the condensed refrigerant is expanded by the orifice 54a, which becomes two phases of refrigerant, gas and liquid, and flows out from the refrigerant outlet pipe 59. Also, by repeating a certain cycle to energize the solenoid 61, it is possible to control a refrigerant flow rate and a degree of heat of a refrigerant cycle.

Next, referring to FIG. 1, a description of a configuration of a refrigerant circuit of the cooling/heating unit 10 will be given. The refrigerant circuit has a cooling-only circuit 10A that carries out only a cooling inside a chamber, and a cooling and heating circuit (heat pump operation circuit) 10B that simultaneously carries out a cooling and heating inside a chamber.

The cooling-only circuit 10A is a circuit that is connected from the compressor 11 to the flow divider 14 via the condenser electromagnetic valve 21, condenser 12, and check valve 25. One portion of the divider 14 is connected to the collector 17 via the electromagnetic expansion valve 50a and evaporator 15a, and the other portion of the divider 14 is connected to the collector 17 via the electromagnetic expansion valves 50b, 50c, check valves 24b, 24c, internal heat exchangers 15b, 15c, and cooler outlet electromagnetic valves 23b, 23c. The cooling-only circuit 10A then returns to the compressor 11 from the collector 17 via the accumulator 18.

Meanwhile, in the cooling and heating circuit 10B, in addition to the cooling-only circuit 10A, there are provided pipelines connected from one outlet of the condenser electromagnetic valve 21, via the parallel connected heater electromagnetic valves 21b, 21c to each connection points 121b, 121c between the check valves 24b, 24c and the inlet side of the internal heat exchangers 15b, 15c, and pipelines connected to the flow divider 14 via the external auxiliary heat exchanger 19 after passing from the outlet side (the right side in the drawing) of the internal heat exchangers 15b, 15c through one each of the check valves 24, 24.

Therefore, the cooling and heating circuit 10B is a circuit connected from the compressor 11 to the internal heat exchangers 15b, 15c, via the condenser electromagnetic valve 21 and heater electromagnetic valves 21b, 21c; connected from the internal heat exchangers 15b, 15c to the flow divider 14 via the check valves 24, 24 and external auxiliary heat exchanger 19; connected from the flow divider 14 to the evaporator 15a via the electronic expansion valve 50a; and returns to the compressor 11 via the collector 17 and accumulator 18.

Figure 5:
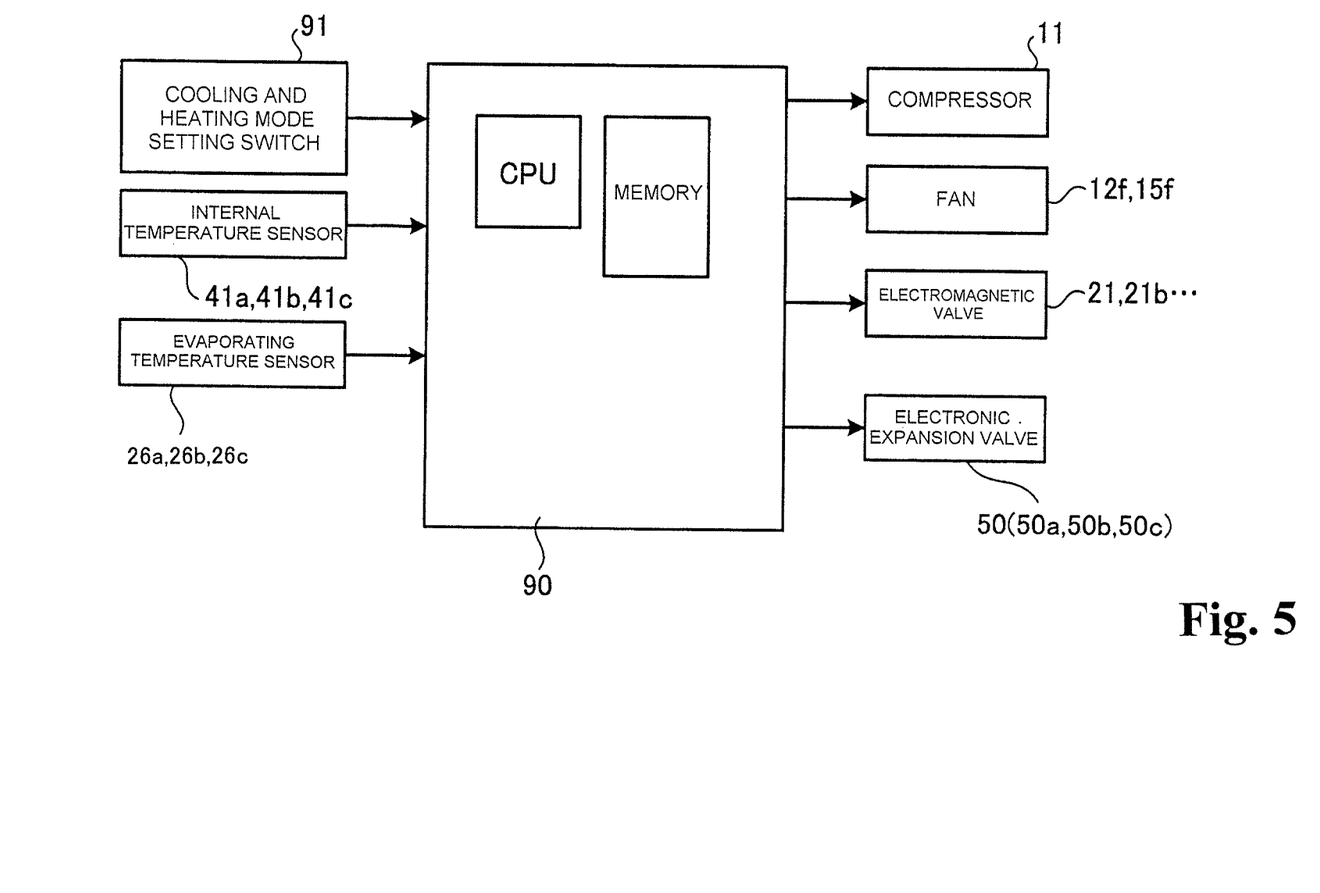
FIG. 5 is a block diagram of a control device that operates the refrigerant circuit shown in FIG. 1.

A control device 90 carries out a control of a cooling or heating of the product storage chambers 40a, 40b, 40c in accordance with a cooling and heating operation mode setting. As shown in FIG. 5, the control device 90 has an internal CPU and memory, which controls a refrigerant circuit compressor operation, an opening and closing of electromagnetic valve, an electronic expansion valve, and the like, in accordance with an operation mode setting of a cooling and heating mode setting switch 91, the temperature of each chamber, and the evaporating temperature. When controlling the temperature inside the chambers, the control device 90 maintains the temperature inside the chambers at an appropriate level by controlling the compressor 11, the condenser electromagnetic valve 21, the electronic expansion valves 50a, 50b, 50c, the cooler outlet electromagnetic valves 23b, 23c, the heater electromagnetic valves 21b, 21c, and the like, in accordance with the temperatures detected by the internal temperature sensors 41a, 41b, 41c, and carrying out a thermal cycling operation that controls on-off of the inside of the chambers within a certain temperature range.

Also, when controlling the electronic expansion valve 50, the control device 90 controls the refrigerant flow rate and evaporating temperature by pulse drive controlling the electronic expansion valves 50a, 50b, 50c in accordance with the temperatures detected by the evaporator temperature sensors 26a, 26b, 26c. Specifically, the control device 90 sends a pulse signal every time a certain cycle time (for example, ten seconds) elapses, with the duty ratio (the ratio of the on time with respect to the cycle time) within a range of 30 to 100%, and controls the evaporating temperatures of the evaporator 15a and internal heat exchangers 15c, 15b to predetermined temperatures by opening and closing the valve body 55c in the electronic expansion valves 50a, 50b, 50c.

With such a configuration, when setting to an operation mode that cools all the product storage chambers with an operation of the cooling and heating mode setting switch 91, the control device 90 opens the cooler outlet electromagnetic valves 23b, 23c, closes the heater electromagnetic valves 21b, 21c, and switches the condenser electromagnetic valve 21 paths in such a way that the refrigerant flows to the condenser 12 side. At this time, the refrigerant flows as shown by the heavy lines of FIG. 6, specifically, a high temperature refrigerant compressed by the compressor 11 passes through the condenser electromagnetic valve 21 and is condensed by the condenser 12, becoming a liquid. The flow is divided into three in the flow divider 14. The liquid expands in the electronic expansion valves 50a, 50b, 50c, becomes a low temperature gas-liquid two phase flow, and flows into the evaporator 15a and internal heat exchangers 15b and 15c. The inflowing refrigerant evaporates in the evaporator 15a and internal heat exchangers 15b, 15c, cooling the product storage chambers 40a, 40b, 40c. The evaporated refrigerant is collected by the collector 17 and divided into gas and liquid using the accumulator 18, and the gas phase returns to the compressor 11.

Figure 6:
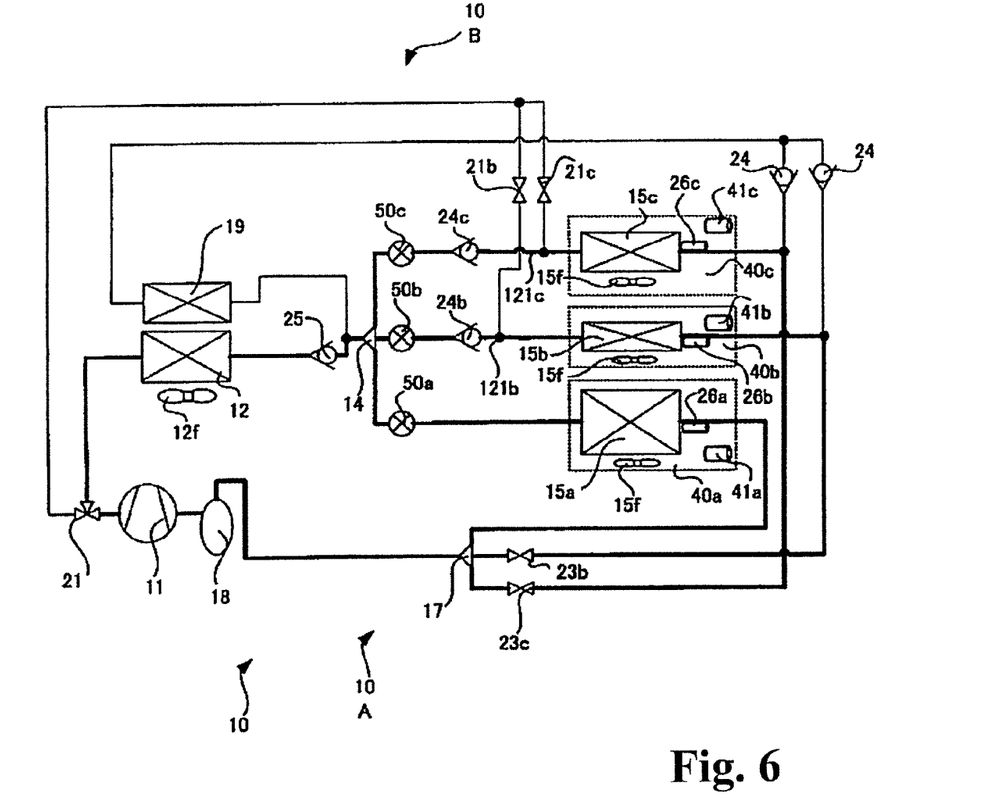
FIG. 6 is a refrigerant circuit diagram showing the flow of a refrigerant in an operation that cools all three chambers according to the embodiment.

The cooling is controlled such that the temperature in the chambers is at an appropriate temperature by the control device 90 with a thermal cycling operation using the internal temperature sensors 41a, 41b, 41c. Also, the control device 90 sends a pulse signal with the duty ratio changed to the electronic expansion valves 50a, 50b, 50c so that the evaporating temperature of the evaporator 15a and internal heat exchangers 15b, 15c becomes a predetermined temperature. That is, when the evaporating temperature is higher than the predetermined temperature, the control device 90 sends a pulse signal with a high duty ratio.

The heretofore described control is such that the operation is continued until the temperature in the chambers reaches the appropriate level, and when one product storage chamber reaches the appropriate temperature, the power to the electronic expansion valve 50 corresponding to the product storage chamber is shut off, and the valve body 55c is closed. Then, the heretofore described control is continued until all the product storage chambers reach the appropriate temperature.

Figure 7:
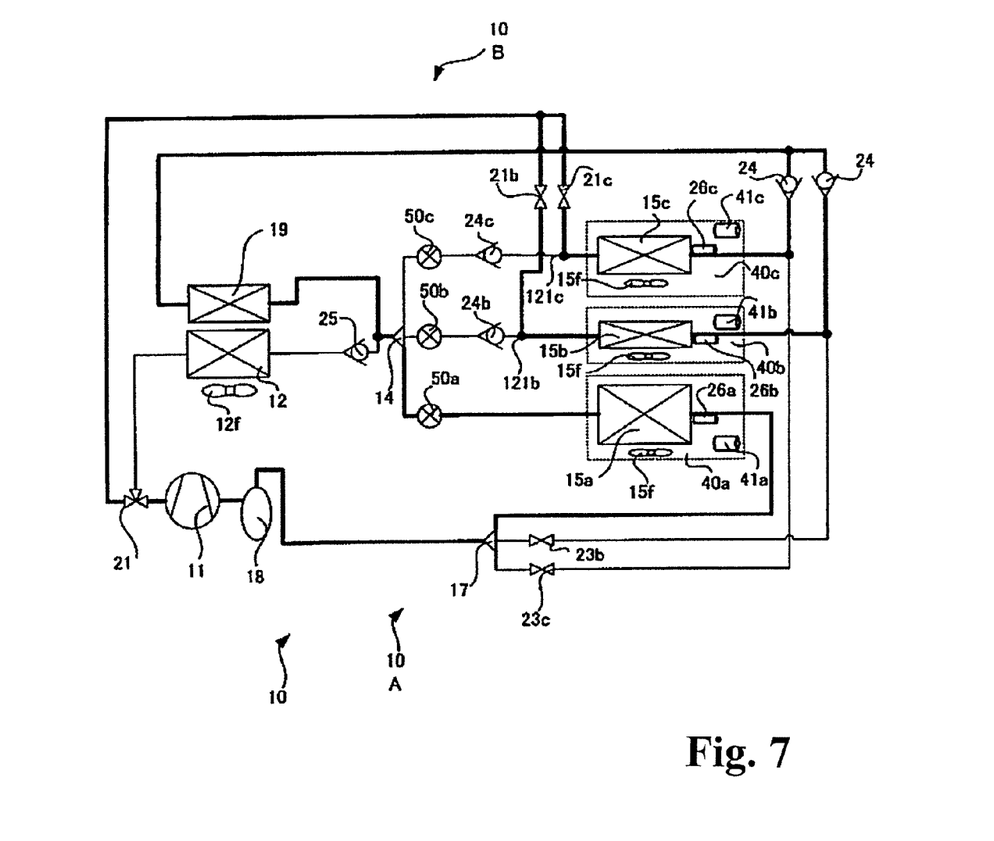
FIG. 7 is a refrigerant circuit diagram showing the flow of a refrigerant in an operation that heats two chambers and cools one chamber according to the embodiment.

Next, when setting the setting mode to an operation mode that cools the left side product storage chamber 40a and heats the central and right side product storage chambers 40b, 40c with an operation of the cooling and heating mode setting switch 91, the control device 90 opens the heater electromagnetic valves 21b, 21c, closes the electronic expansion valves 50b, 50c and cooler outlet electromagnetic valves 23b, 23c, and carries out a switching of the condenser electromagnetic valve 21 paths such that the refrigerant flows to the heater electromagnetic valves 21b, 21c side. At this time, a high temperature refrigerant compressed by the compressor 11 flows into the internal heat exchangers 15b, 15c via the condenser electromagnetic valve 21, the heater electromagnetic valves 21b, 21c, and contact points 121b and 121c, as shown by the heavy lines of FIG. 7. The refrigerant flowing into the internal heat exchangers 15b, 15c condenses, heats the product storage chambers 40b, 40c, is collected by the check valves 24, 24, further condenses in the external auxiliary heat exchanger 19, and flows into the electronic expansion valve 50a via the flow divider 14. The refrigerant flowing into the electronic expansion valve 50a expands, becomes a low temperature, low pressure gas-liquid two phase flow, and flows into the evaporator 15a. The refrigerant flowing into the evaporator 15a evaporates, cooling the product storage chamber 40a, and returns to the compressor 11 via the collector 17 and the accumulator 18. Also, this heat pump operation is such that the electronic expansion valve 50a is controlled so that the evaporating temperature of the evaporator 15a becomes a predetermined temperature, as heretofore described, and the inside of the chamber is maintained at an appropriate temperature with a thermal cycling operation.

In this way, the electronic expansion valves 50a, 50b, 50c have the disc spring 70 urging the valve body 55c to close the orifice 54a expanding the refrigerant and the solenoid 61 that suctions the valve body 55c to open the orifice 54a, and expand the refrigerant by opening and closing the valve body 55c. The rigidity of the valve body 55c in the radial direction is increased, and the valve body 55c optimally driven in the axial direction, by the plural slits 73 formed in a spiral form being provided at mutually equal pitches on the perimeter in the disc spring 70. Therefore, there is no need for a guide that regulates the axial direction and the occurrence of sludge due to sliding is suppressed. Because of this, it is possible to provide a low cost refrigerant cycle electronic expansion valve that operates stably over a long period.

INDUSTRIAL APPLICABILITY

As heretofore described, the electronic expansion valve according to the invention is appropriate for use in an instrument having a refrigerant circuit that cools or heats an automatic vending machine, air conditioner, or the like.

DESCRIPTION OF REFERENCE NUMERALS AND SIGNS

10 Cooling/heating unit
11 Compressor
12 Condenser
15a Evaporator
15b, 15c Internal heat exchanger
21 Condenser electromagnetic valve
21b, 21c Heater electromagnetic valve
23b, 23c Cooler outlet electromagnetic valve
40a, 40b, 40c Product storage chamber
50a, 50b, 50c Electronic expansion valve
54 Valve seat
54a Orifice (small hole)
55 Armature
55c Valve body
61 Solenoid
90 Control device
91 Cooling and heating mode setting switch

What is claimed is:
1. An electronic expansion valve, comprising:
a main body having a small hole for expanding a refrigerant;
an armature disposed in the main body and including an adsorption portion, a central portion disposed under the adsorption portion, and a valve body disposed under the central portion and opening and closing the small hole;

an elastic member urging the valve body to close the small hole, the elastic member being disposed in the main body and fixed to a side portion of the armature; and a solenoid moving the valve body in a direction away from the small hole to open the small hole, the solenoid being arranged at a side of the main body laterally away from a moving direction of the valve body, wherein the elastic member is a disc spring having a plurality of slits formed in a spiral form in a disc board and disposed at mutually equal pitches, and wherein the main body includes an upper portion made of a ferromagnetic cylindrical member and having an inflow portion, a suction portion extending downwardly from the upper portion, and a lower portion disposed under the suction portion and having a space to receive the armature therein so that when the solenoid is actuated, the suction portion is activated to draw the armature.

2. An electronic expansion valve according to claim 1, wherein the valve body is opened and closed in a certain cycle.

3. An electronic expansion valve according to claim 1, wherein the main body further includes a side portion made of a non-magnetic cylindrical member and connecting the upper portion and the lower portion of the main body to form a main body internal portion communicating with the space in the lower portion.

4. An electronic expansion valve according to claim 3, wherein the main body further includes a valve seat having the small hole therein and disposed in the space of the lower portion, wherein an upper portion of the valve seat contacts the armature to close the small hole.

5. An electronic expansion valve according to claim 3, further comprising an upper fixing plate connecting an upper portion of the solenoid and the upper portion of the main portion, and a lower fixing plate connecting a lower portion of the solenoid and the lower portion of the main portion so that when the solenoid is actuated, a magnetic flux emitted from the solenoid flows along the upper fixing plate, the upper portion of the main body, the armature, a lower portion of the main body, and the lower fixing piece.

6. An electronic expansion valve according to claim 3, wherein the side portion includes a plurality of grooves on a peripheral surface thereof in an axial direction.

\* \* \* \* \*